US010983899B2

(12) United States Patent
Zingade et al.

(10) Patent No.: US 10,983,899 B2
(45) Date of Patent: Apr. 20, 2021

(54) AUTOMATIC CONFIGURATION AND DEPLOYMENT OF ENVIRONMENTS OF A SYSTEM

(71) Applicant: Accenture Global Solutions Limited, Dublin (IE)

(72) Inventors: Swati Zingade, Mumbai (IN); Jayanthi Mohanram, Bangalore (IN); Deepak Samtaney, Navi Mumbai (IN); Chitkala Ramakrishna, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 3 days.

(21) Appl. No.: 16/569,154

(22) Filed: Sep. 12, 2019

(65) Prior Publication Data

US 2020/0142810 A1     May 7, 2020

(30) Foreign Application Priority Data

Nov. 1, 2018   (IN) .............................. 201841041384

(51) Int. Cl.
  *G06F 11/36*      (2006.01)
  *G06F 8/60*       (2018.01)
(52) U.S. Cl.
  CPC ............ *G06F 11/3664* (2013.01); *G06F 8/60* (2013.01); *G06F 11/3684* (2013.01)
(58) Field of Classification Search
  USPC ........................................................ 717/124
  See application file for complete search history.

(56) References Cited

U.S. PATENT DOCUMENTS

| 7,536,686 B2 * | 5/2009 | Tan .......................... G06F 8/61 |
| | | 717/174 |
| 2007/0061780 A1 | 3/2007 | Pokluda et al. |
| 2011/0154320 A1 | 6/2011 | Verma |
| 2013/0132950 A1 | 5/2013 | McLeod et al. |

(Continued)

FOREIGN PATENT DOCUMENTS

JP       2015156077 A      8/2015

OTHER PUBLICATIONS

Ularu et al., Mobile Computing and Cloud Maturity . . . , 2013, pp. 40-51 (Year: 2013).*

*Primary Examiner* — John Q Chavis
(74) *Attorney, Agent, or Firm* — Harrity & Harrity, LLP

(57) ABSTRACT

A device may receive a request to configure an environment for a target enterprise resource planning (ERP) system. The device may identify a system image of an ERP package. The device may provide, to other devices that are to support the environment, the system image and installation information to cause the other devices to use the system image to host the ERP package. The device may establish paths that permit data transmission between the target ERP system and a source ERP system. The device may identify development-operations (Dev-Ops) and test tools to be configured within the environment. The device may provision, using the one or more paths, the environment with the set of Dev-Ops and test tools. The device may provide instructions to the other devices to cause the other devices to deploy the environment of the target ERP system and to permit user devices to access the environment.

20 Claims, 9 Drawing Sheets

(56) References Cited

U.S. PATENT DOCUMENTS

| | | | | |
|---|---|---|---|---|
| 2014/0317166 A1* | 10/2014 | Iyoob | ................... | G06Q 40/00 |
| | | | | 709/201 |
| 2015/0324182 A1* | 11/2015 | Barros | ................ | G06F 9/44505 |
| | | | | 717/174 |
| 2015/0341240 A1* | 11/2015 | Iyoob | ................... | G06Q 40/00 |
| | | | | 709/201 |
| 2016/0078342 A1* | 3/2016 | Tang | ...................... | H04L 41/00 |
| | | | | 706/47 |
| 2017/0371636 A1 | 12/2017 | Palavalli et al. | | |
| 2018/0191867 A1 | 7/2018 | Siebel et al. | | |

\* cited by examiner

AUTOMATIC CONFIGURATION AND DEPLOYMENT OF ENVIRONMENTS OF A SYSTEM

RELATED APPLICATION

This application claims priority under 35 U.S.C. § 119 to Indian Patent Application No. 201841041384, filed on Nov. 1, 2018, the content of which is incorporated by reference herein in its entirety.

BACKGROUND

Enterprise resource planning (ERP) is the integrated management of end-to-end processes of an organization. An ERP system may include one or more systems, environments, and/or tools that may be utilized to create content that is used to manage the end-to-end processes of the organization. For example, the ERP system may include development environments for creating the content, quality environments for testing the content, and production environments for deploying the content.

SUMMARY

According to some possible implementations, a device may include one or more memories and one or more processors operatively connected to the one or more memories. The one or more processors may receive, from a user device, a request to configure one or more environments for a target enterprise resource planning (ERP) system of an organization. The one or more processors may obtain, using information included in the request, a system image associated with an ERP package that is a packaged instance of the one or more environments of the target ERP system. The one or more processors may provide, to a group of devices that are to support the one or more environments: the system image, and installation information to permit the group of devices to use the system image and the installation information to configure one or more virtual machines to host the ERP package. The one or more processors may perform a set of post-installation procedures to prepare the one or more environments for deployment. The set of post-installation procedures may include a first procedure to establish one or more paths that permit at least one of: transmission of data to at least one of the one or more environments, or receipt of the data by at least one of the one or more environments. The one or more processors may identify, using additional information included in the request, a set of development-operations (Dev-Ops) and test tools to be used within the one or more environments. The one or more processors may provision, using the one or more paths, the one or more environments with the set of Dev-Ops and test tools. The one or more processors may provide a set of instructions to the group of devices to cause the group of devices to use the one or more virtual machines to deploy the one or more environments of the target ERP system and to permit a group of user devices to access the one or more environments.

According to some possible implementations, a method may include receiving, by a device and from a user device, a request to configure an environment for a target enterprise resource planning (ERP) system of an organization. The method may include identifying, by the device and after receiving the request, a system image associated with an ERP package. The ERP package may include at least one of: a core ERP system or a development management system. The method may include providing, by the device and to a group of devices that are to support the environment: the system image, and installation information to permit the group of devices to configure one or more virtual machines to host the ERP package. The method may include performing, by the device, a set of post-installation procedures to prepare the environment for deployment. The set of post-installation procedures may include a first procedure to establish one or more paths that permit at least one of: transmission of data to the environment of the target ERP system, or receipt of the data by the environment of the target ERP system. The method may include identifying, by the device and after performing the set of post-installation procedures, a set of development-operations (Dev-Ops) and test tools that are to be configured within the environment. The method may include provisioning, by the device and by using the one or more paths, the environment with the set of Dev-Ops and test tools. The method may include providing, by the device, a set of instructions to the group of devices to cause the group of devices to use the one or more virtual machines to deploy the environment of the target ERP system and to permit a group of user devices to access the environment.

According to some possible implementations, a non-transitory computer-readable medium may store instructions that include one or more instructions that, when executed by one or more processors of a device, cause the one or more processors to: receive, from a user device, a request to configure one or more environments for a target enterprise resource planning (ERP) system of an organization. The one or more instructions may cause the one or more processors to identify, using information included in the request, one or more system images associated with one or more ERP packages. The one or more instructions may cause the one or more processors to provide, to the group of devices, the one or more system images and installation information that the group of devices are to use to host the one or more ERP packages. The installation information may include system information values that permit the group of devices to perform a value replacement technique to replace one or more placeholder system information values included in the ERP package with the system information included in the installation information. The one or more instructions may cause the one or more processors to perform a set of post-installation procedures to prepare the one or more environments for deployment. The set of post-installation procedures may include a first procedure to establish one or more paths that permit at least one of: transmission of data to the one or more environments of the target ERP system, or receipt of the data by the one or more environments of the target ERP system. The one or more instructions may cause the one or more processors to identify, using additional information included in the request, a set of development-operations (Dev-Ops) and test tools that are to be configured within the one or more environments. The one or more instructions may cause the one or more processors to provision, using the one or more paths, the one or more environments with the Dev-Ops and test tools. The one or more instructions may cause the one or more processors to provide a second set of instructions to the group of devices to cause the group of devices to deploy the one or more environments of the target ERP system and to permit a group of user devices to access the one or more environment.

DETAILED DESCRIPTION

Figure 1A:
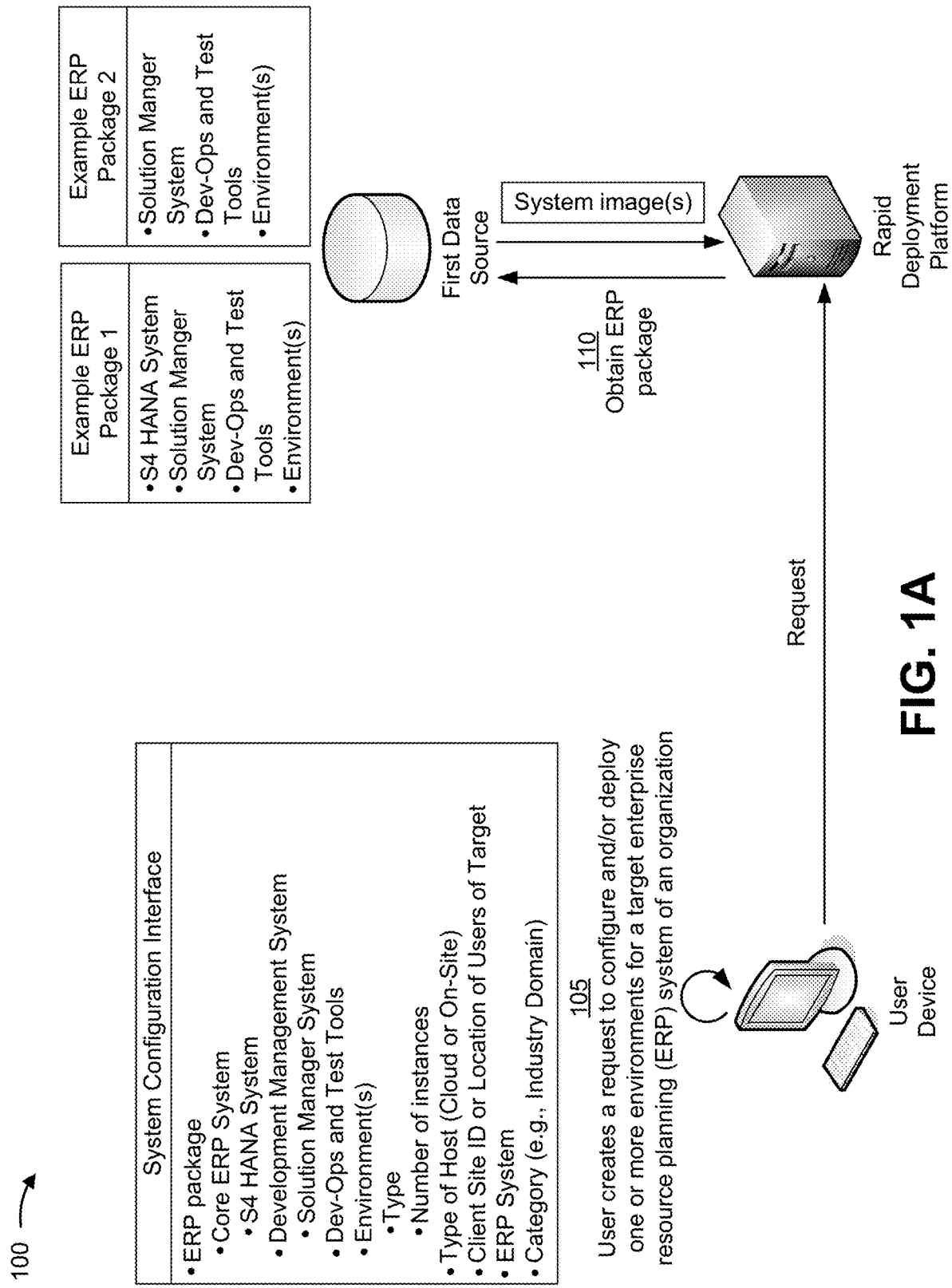
FIGS. 1A-1D are diagrams of an example implementation described herein.

The following detailed description of example implementations refers to the accompanying drawings. The same reference numbers in different drawings may identify the same or similar elements.

Enterprise resource planning (ERP) may refer to the integrated management of end-to-end processes of an organization. An ERP system may include one or more systems, environments, and/or tools that may be utilized to create content that is used to manage the end-to-end processes of the organization.

A product development life cycle for creating content within an ERP system may involve a blueprinting phase, a development phase, a testing phase, and a production phase. During the blueprinting phase, employees of the organization may create a blueprint that identifies environments of the ERP system that allow users to work on particular projects, create particular content, and/or the like. The environments may include a development environment for creating the content, a quality environment for testing the content, a production environment for deploying the content, and/or the like.

While a fully functional ERP system provides an end-to-end solution for creating content within the ERP system, the organization may expend a considerable amount of resources (e.g., processing resources, network resources, memory resources, human resources, etc.) configuring and deploying the environments of the ERP system. For example, the organization may need to select a type of host for the ERP system (e.g., a cloud-based host, an on-site host etc.), identify resources that need to be provided to devices that are to host the ERP system, provide the devices with instructions indicating how to configure the environments of the ERP system with deployment-ready resources (e.g., by configuring transport requests, configuring user profiles, pushing organization data to databases of the ERP system, etc.), and/or the like.

Furthermore, the organization may need to configure and deploy different instances of the environments for different groups within the organization, may need to configure the different instances of the environments using different hosts (e.g., different cloud service providers, a mix of cloud service providers and on-site hosting, etc.), may need to configure the different instances of the environments with different types of tools (e.g., software tools for creating content), and/or the like. Additionally, the ERP system may include a number of standardized tools that may not be customized to fit the need of the organization. As such, the organization may expend additional resources adding customized tools and resources to the environments.

Some implementations described herein provide a rapid deployment platform to orchestrate automatic configuration and deployment of one or more environments for a target enterprise resource planning (ERP) system of an organization. For example, the rapid deployment platform may receive a request to configure environments for a target ERP system of an organization. In this case, the rapid deployment platform may perform a set of actions (e.g., as described further herein) to configure virtual machines to host the one or more environments, and may perform post-installation procedures to prepare the one or more environments for deployment.

Additionally, the rapid deployment platform may automatically provision the one or more environments with a set of development-operations (Dev-Ops) and test tools. Furthermore, the rapid deployment platform may instruct a group of servers that are hosting the virtual machines to deploy the one or more environments. This may cause the group of servers to deploy the one or more environments, such that the one or more environments are accessible to user devices of the organization.

In this way, the rapid deployment platform orchestrates automatic configuration and/or deployment of environments of the target ERP system. Furthermore, several different stages of the process for configuring and/or deploying environments of the target ERP system are automated, which may remove human subjectivity and waste from the process, and which may improve speed and efficiency of the process and conserve computing resources (e.g., processor resources, memory resources, and/or the like). Additionally, implementations described herein use a rigorous, computerized process to perform tasks or roles that were not previously performed or were previously performed using subjective human intuition or input. For example, the rapid deployment platform may intelligently identify Dev-Ops and test tools to provision to environments and may modify the Dev-Ops and test tools to include values that are specific to the organization requesting configuration and/or deploying of those environments.

Furthermore, by orchestrating automatic configuration and deployment of the one or more environments, the rapid deployment platform reduces an amount of time needed to complete one or more phases of the product development life cycle. This conserves processing resources and/or network resources that would otherwise be used to manually configure and deploy the one or more environments, correct configuration and/or deployment errors caused by the manual configuration and deployment of the one or more environments, and/or the like.

Additionally, by orchestrating automatic configuration and deployment of Dev-Ops and test tools within the one or more environments, the rapid deployment platform reduces a utilization of processing resources and/or network resources that would be used to synergize the Dev-Ops and test tools with other tools within the one or more environments, that would be used to debug the Dev-Ops and test tools within the one or more environments, and/or the like. In some cases, the rapid deployment platform may use machine learning to intelligently predict one or more requirements to be used for configuration of an environment of the ERP system. This reduces time needed to complete the blueprinting phase of the product development life cycle, thereby reducing a utilization of resources (e.g., human resources, computing resources, etc.) needed to identify and select the one or more requirements.

FIGS. 1A-1D are diagrams of an example implementation 100 described herein. For example, example implementation 100 may include a user device, a first data source, a rapid deployment platform, a source ERP system, and a group of devices that are to host a target ERP system.

As shown in FIG. 1A, and by reference number 105, a user may create a request to configure and/or deploy one or more environments for a target enterprise resource planning (ERP) system of an organization. For example, the user may interact with an interface of a program or a website to create a request to configure and deploy one or more environments for an ERP system. The program or the website may provide a set of ERP services that include a service for automatically configuring environments of a target ERP system.

The request may include configuration information identifying an ERP package, a type of host (e.g., cloud-based, on-site, etc.), a location of a site that supports employees that are to use the ERP system (e.g., which may be used to identify nearby data centers for hosting the ERP system), a category relating to projects that are to be completed within the one or more environments (e.g., which may be used to configure, to the one or more environments, development-operations (Dev-Ops) and test tools that are associated with the category), and/or the like, as each described below.

An ERP package may be a packaged instance of one or more systems, environments, and/or tools that may be used within the target ERP system. For example, the one or more systems may include a core ERP system, a development management system, and/or the like. The core ERP system may be an S4 HANA system or a similar type of system and may include a set of core tools that may be used within the target ERP system, such as tools that may be used within the one or more environments, database management tools, and/or the like. The development management system may be a Solution Manager system or a similar type of system, and may include a set of development management tools that may be used within the target system, such as development management tools that may be used with the one or more environments. In some cases, the ERP package may include a set of Dev-Ops and test tools, which may be used within the one or more environments as part of the core ERP system and/or as part of the development management system.

The one or more environments may be used as part of the core ERP system and/or as part of the development management system, and may provide an interface that allows employees of the organization (e.g., engineers, software developers, program managers, etc.) to access the systems and/or tools. The one or more environments may include a development environment, a testing environment, a production environment, and/or the like.

A development environment may support code development tools, such as a text editor, a compiler, a debugger, an integrated development environment, and/or the like. A testing environment may support code testing tools, such as a testing tool for performing automatic review of code, a component-based test automation (CBTA) tool, a code coverage tool, and/or the like. A production environment may be an environment where the content created within the target ERP system may be deployed and available to end-users.

In some implementations, a single environment may include two or more of the above-mentioned environments. For example, a single environment may include tools and/or aspects of both the development environment and the testing environment. Additionally, the one or more environments described above are provided by way of example. In practice, additional environments may be used, such as a staging environment (e.g., for tasks occurring before the blueprinting phase), a practice or training environment (e.g., where developers may familiarize themselves with content that has been created and tested but that has yet to be deployed), and/or the like.

In some implementations, while creating the request, the user may select an ERP package. For example, the user may interact with the user interface to select an ERP package that includes any combination of systems, environments, and/or tools, as described above. In some cases, the user may input desired systems, environments, and/or tools (e.g., into a free-form text box), which the rapid deployment platform may then use to identify a particular ERP package.

In some implementations, while creating the request, the user may select multiple ERP packages. For example, the user may want two separate ERP packages to be configured and deployed, such that users associated with a first site of the organization are able to access a first instance of the one or more environments and users associated with a second site of the organization are able to access a second instance of the one or more environments (e.g., which may include different systems, environments, tools, etc.).

Additionally, or alternatively, while creating the request, the user may select or input a type of host for the target ERP system. For example, the user may select or input whether the one or more environments are to be hosted in the cloud, hosted on-site at a particular site of the organization, and/or partially hosted in the cloud and partially hosted on-site. If the user selects to host the target ERP system via the cloud, the user may be prompted to select or input a preferred cloud service provider. If the user selects to host the target ERP system on-site, the user may also be prompted to select or input a site identifier or location of a site that is to host the target ERP system and/or any other information that may be needed to host the target ERP system.

Additionally, or alternatively, while creating the request, the user may select or input a location of a site that supports employees that are to use the ERP system, such as by selecting a site identifier or a geographic location of the site. For example, if a team of developers that will use a development environment of the target ERP system are located at a particular site, the user may input a site name or a geographic location of the site. This may allow the rapid deployment platform (and/or a cloud service provider) to identify nearby devices for hosting the target ERP system (e.g., devices in a data center in the same geographic region as the site), as described further herein.

Additionally, or alternatively, while creating the request, the user may select or input a category relating to a project that is to be completed within the one or more environments, such as an industry domain in which the organization provides a service, a project domain of projects that are to be completed within the one or more environments, and/or the like. For example, if the organization provides services relating to a retail domain, the user may select or input retail as the domain. This may cause a domain identifier for the retail domain to be provided to the rapid deployment platform, which may be used to identify and configure a set of custom Dev-Ops and test tools (e.g., a Dev-Ops and test tool that may be used to complete a project in the retail domain) for the one or more environments, as described further herein.

In some implementations, the rapid deployment platform may receive a request to configure and/or deploy one or more environments using multiple host sites. For example, the request may include configuration information indicating to configure a first set of one or more environments at a first host site and a second set of one or more environments at a second host site. In this case, the second set of one or more environments may be different environments or the same environments as those included in the first set of one or more environments.

In some cases, the multiple host sites may be associated with different types of hosts. For example, the first host site may be a data center associated with a first cloud service provider and the second host site may be a data center associated with a second cloud service provider or an on-site location of the organization.

In some implementations, the program or the website may include a data collection interface that is separate from an interface where a user may select or input the request. For example, an employee of the vendor organization may be tasked with interacting with one or more devices and/or employees of a client organization to obtain the configuration information needed to configure the one or more environments of the target ERP system. The employee may then upload the configuration information to the data collection interface. In this case, an administrator associated with the client organization may log in to the interface for requesting configuration and/or deployment of the one or more environments and may submit a request without needing to input the configuration information. This may cause the rapid deployment platform to perform a set of actions to automatically service the request, as described further herein. In this way, the administrator is able to utilize a "one-click" solution for automatic configuration and/or deployment of one or more environments of the target ERP system.

In some implementations, the rapid deployment platform may predict and automatically populate configuration information that is to be included in the request made by the user device. For example, the rapid deployment platform may train a data model on historical data using one or more machine learning techniques. The historical data may include historical collections of ERP packages, historical information relating to the organization (e.g., previously hosted ERP systems, historical location information of sites, and/or the like), historical host type information, historical network infrastructure information, and/or the like. In this case, the user device may input a request to configure and/or deploy the target ERP system, where the request does not include configuration information identifying an ERP package, a preferred type of host, a list of organization sites that are to use the target ERP system, and/or the like. This request may include an identifier for the user device providing the request, a user account of the user making the request, the organization, the site associated with the user making the request, and/or the like, but these identifiers are to be automatically captured and included in the request (e.g., without any user interaction from the user).

Thereby, the rapid deployment platform may provide the one or more identifiers included in the request as input to the data model, which may cause the data model to identify configuration information that has a threshold likelihood of aligning with preferences of the organization and/or the user making the request. In some cases, the rapid deployment platform may provide the identified configuration information for display via an interface accessible to the user device, which may allow the user to review, approve, and/or modify the identified configuration information. In other cases, the rapid deployment platform may use the identified configuration information to automatically perform one or more actions associated with satisfying the request. In this way, rapid deployment platform reduces time needed to complete a blueprinting phase of the product development life cycle, thereby reducing a utilization of resources (e.g., human resources, computing resources, etc.) needed to identify and select one or more requirements for the request.

In some implementations, the program or the website may be operated by a vendor organization. In some implementations, the organization requesting the configuration of the one or more environments may be the vendor organization, who may be using the program or the website internally. In some implementations, the organization requesting the configuration of the one or more environments may be a client organization that has contracted with the vendor organization to access the set of ERP services provided by the program or the website.

In some implementations, the request to configure and/or deploy the one or more environments may be a request to configure one or more environments that are to be used as part of a new ERP system. In some implementations, the request to configure and/or deploy the one or more environments may be a request to configure one or more environments that are to be used as part of an existing ERP system.

As shown by reference number 110, the rapid deployment platform may obtain the ERP package identified in the request. For example, the data source may store a collection of system images associated with different ERP packages. A system image may be a serialized copy of a particular collection of systems, environments, and/or tools, as described herein. In this case, the rapid deployment platform may perform a search query to obtain, from the data source, the system image associated with the ERP package identified via the request. In some cases, such as when the request identifies multiple ERP packages, the rapid deployment platform may perform search queries to obtain multiple system images associated with the multiple ERP packages.

In this way, the rapid deployment platform receives requests to configure and/or deploy one or more environments of a target ERP system and obtains an ERP package that may be used to satisfy the request, as described further herein.

Figure 1B:
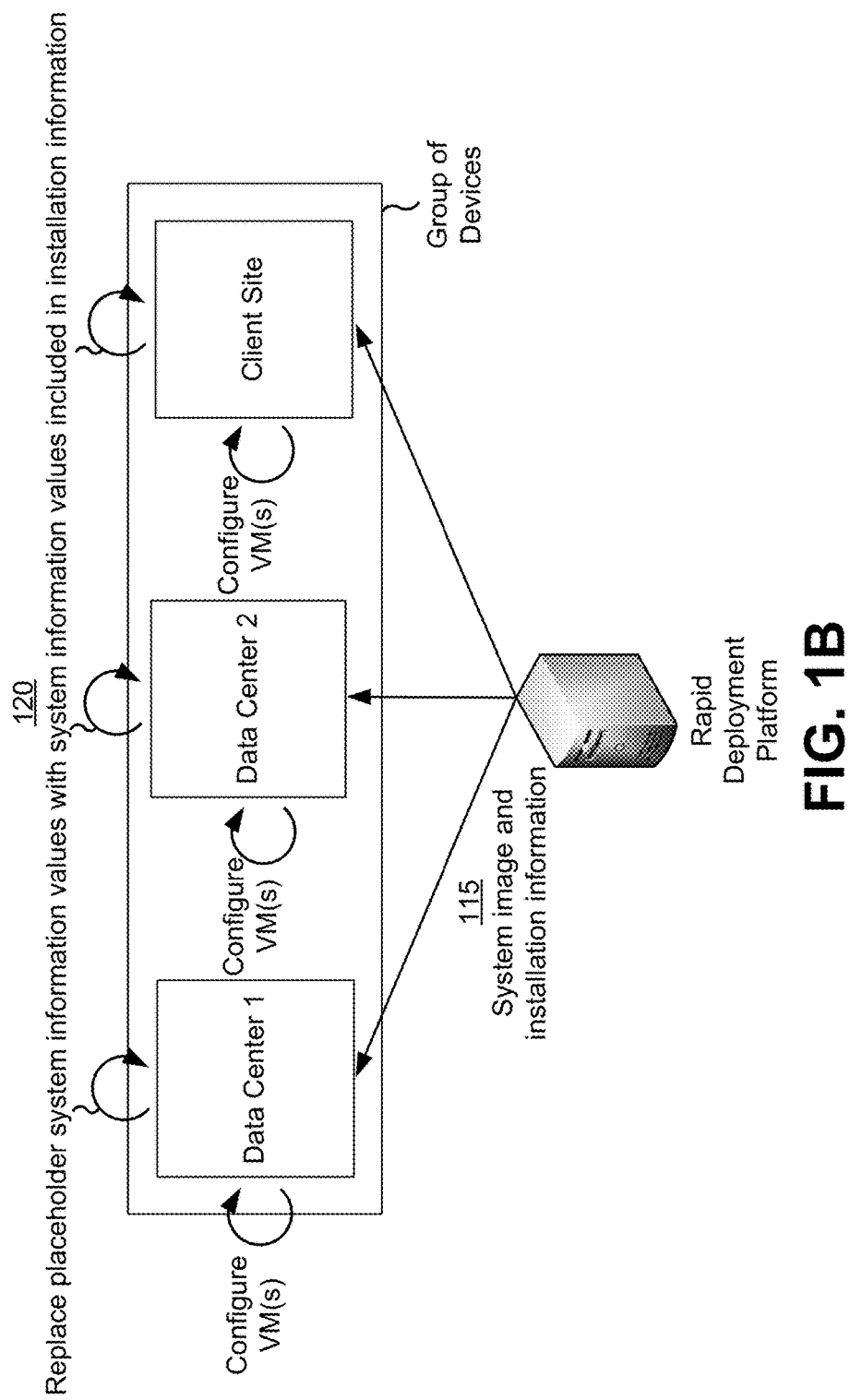

As shown in FIG. 1B, and by reference number 115, the rapid deployment platform may provide the system image and installation information to the group of devices that are to host the target ERP system. For example, the rapid deployment platform may interact with an interface (e.g., a web interface) to prepare installation information for the target ERP system and to upload the system image, and which may allow the group of devices to use the system image and the installation information to configure one or more virtual machines to host the one or more environments. In some implementations, the group of devices may be configured to host the one or more environments without using virtual machines.

In some implementations, the rapid deployment platform may prepare installation information that may be used for hosting the one or more environments. For example, the rapid deployment platform may prepare the installation information by establishing an account with an organization that is to host the target ERP system, by preparing infrastructure information needed to establish a network infrastructure for the target ERP system, and/or the like.

As an example, if the user requests the target ERP system to be hosted by a particular cloud service provider, the group of devices may be servers of a data center associated with the particular cloud service provider. In this example, the rapid deployment platform may prepare the installation information by interacting with an interface (e.g., a web interface of the cloud service provider) to establish connectivity with a cloud account associated with the cloud service provider and to set up a network infrastructure for the target ERP system. While establishing the connectivity with the cloud account, the rapid deployment platform may select a geographic region to be used to identify the servers of the data center (e.g., based on the location of the sites provided in the request).

Continuing with the example, the rapid deployment platform may establish a pair key that may be used to access the target ERP system (e.g., a username and password). Furthermore, the rapid deployment platform may set up the network infrastructure by establishing a virtual private network (VPN), a VPN subnet, VPN security groups, and/or the like. In some cases, the installation information may include system requirements information needed to support the target ERP system. The system requirements information may be used to identify an amount of resources (e.g., virtual resources) to allocate as part of one or more virtual machines that are to be used to host the target ERP system, to identify which virtual machines to select to host the target ERP system, and/or the like.

In some implementations, the rapid deployment platform may provide the system image and the installation information to the group of devices. Continuing with the example above, the interface for preparing the installation information may also allow the rapid deployment platform to upload the system image. After the rapid deployment platform creates an account and establishes a network infrastructure, the installation information and the system image may be provided to the group of devices that are to host the ERP system (e.g., the servers of the data center).

In some implementations, the group of devices may configure one or more virtual machines to host the ERP package. For example, the ERP management platform may provide, to a device, of the group of devices, the system image of the ERP package and the installation information that may be used to configure a virtual machine to host the ERP package. This may cause the group of devices to create one or more virtual machines (or prepare existing virtual machines), mount the system image to the one or more virtual machines (e.g., to disk space associated with the one or more virtual machines), and to launch an installation package to make the contents of the system image available via the one or more virtual machines.

In some implementations, the rapid deployment platform may provide the image system and the installation information to the group of devices, such that the same ERP package is hosted on multiple virtual machines. In some implementations, the rapid deployment platform may provide the image system and the installation information to the group of devices, such that particular ERP packages are hosted on particular virtual machines. In some implementations, the rapid deployment platform may prepare installation information for multiple host organizations (e.g., multiple cloud service providers, the organization providing the request, etc.), and may provide the same ERP package to be hosted on virtual machines of different host organizations. In some implementations, the rapid deployment platform may prepare installation information for multiple host organizations and may provide different ERP packages to be hosted on virtual machines of different host organizations.

As shown by reference number 120, the group of devices may replace placeholder system information values with system information values included in the installation information. For example, the installation information may include system information values identifying a hostname, a system identifier (e.g., to identify a particular instance of the target ERP system), a database system identifier (e.g., to identify a particular instance of a database of the target ERP system), and/or the like. In this case, the group of devices may perform a value replacement technique to replace one or more placeholder system information values with one or more system information values provided as part of the installation information. As such, the group of devices may be configured with system information identifying which devices are hosting particular instances of the target ERP system.

In this way, the rapid deployment platform causes the group of devices to configure one or more virtual machines to host particular instances of the one or more environments of the target ERP system.

Figure 1C:
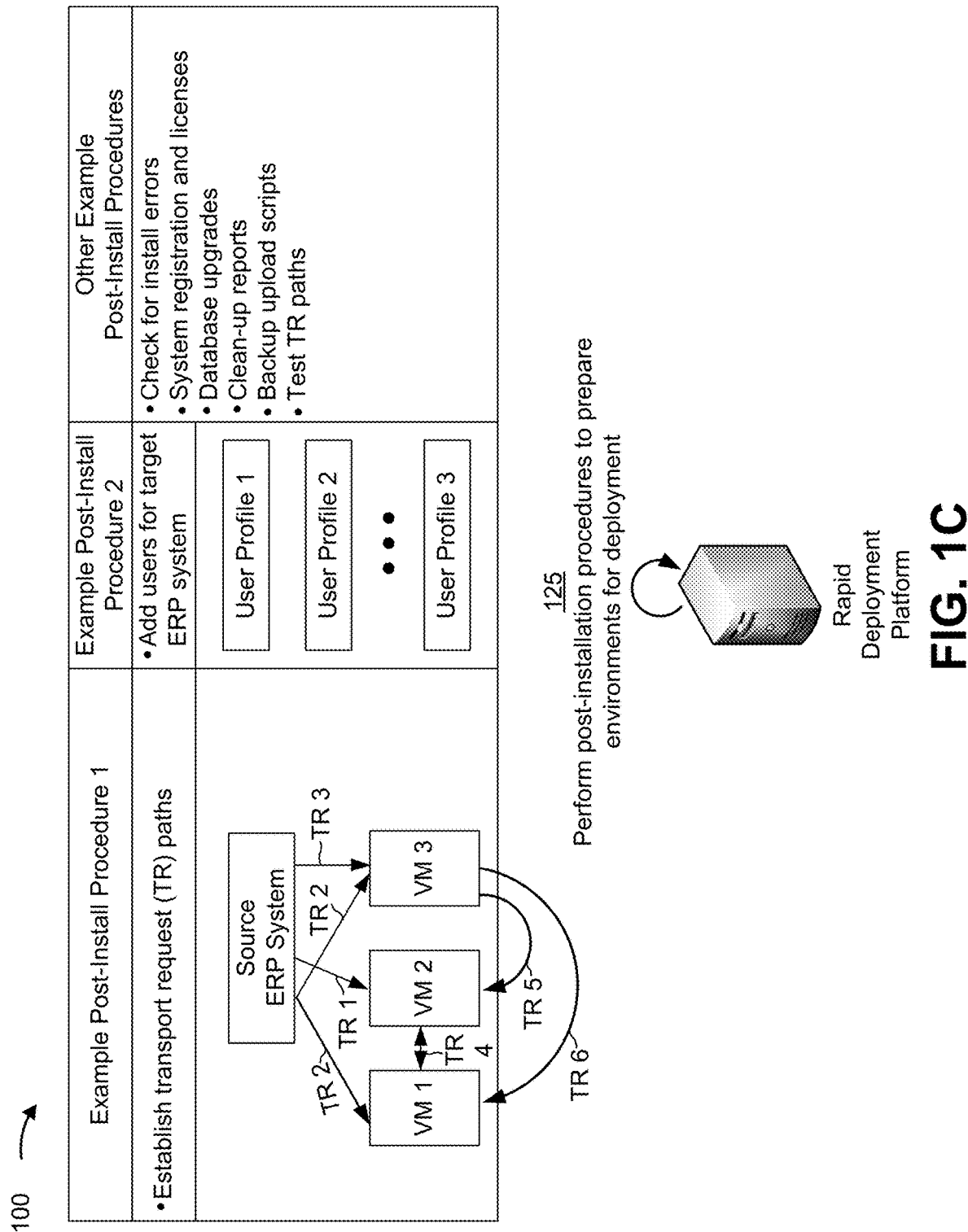

As shown in FIG. 1C, and by reference number 125, the rapid deployment platform may perform a set of post-installation procedures to prepare the one or more environments of the target ERP system for deployment. For example, the group of devices may have configured one or more virtual machines to host the one or more environments, but additional modifications and/or additions may need to be made to the one or more environments to prepare the one or more environments for deployment (e.g., readiness for deployment activities).

The set of post-installation procedures may include a procedure to establish one or more paths (e.g., transport request paths) that permit data transmission (e.g., between an environment of the target ERP system and an environment of a source ERP system, between environments within the target ERP system, etc.), a procedure for adding users to the target ERP system, a procedure for checking for installation errors, a procedure for obtaining system registration and licenses a procedure for performing a clean-up report, a procedure for performing a backup upload of one or more scripts, a procedure for testing one or more transport request paths, a procedure to configure and/or test a gateway that is part of the network infrastructure, a security-related procedure, and/or the like. In some cases, different post steps may be performed for different combinations of systems and/or environments.

In some implementations, the rapid deployment platform may automatically perform a post-installation procedure by interacting with an environment of the target ERP system. For example, the one or more post-installation procedures may be performed within the environment that is being hosted by the one or more virtual machines, and the rapid deployment platform may log in to the environment (e.g., using the key pair configured elsewhere herein) to perform a post-installation procedure needed to prepare the environment for deployment.

As shown as an example, the rapid deployment platform may perform a post-installation procedure to establish a set of transport request paths between a source ERP system and the target ERP system and/or transport request paths between environments within the target ERP system. This may allow the source ERP system to provide data to the target ERP system and/or to allow environments within the target ERP system to provide data to each other (e.g., by making transport requests to securely transmit the data to another environment or system).

In this example, the rapid deployment platform may log into an environment of the target ERP system (e.g., a production environment) and may execute a transport management program that was installed as part of the ERP package to establish the set of transport request paths. In this example, the rapid deployment platform may select the environment as a transport domain controller, which may allow the environment to be the only environment in the target ERP system that is able to control transport paths. Furthermore, the rapid deployment platform may use the transport management program to establish the set of transport request paths by adding paths between particular environments within the target ERP system, by adding paths between particular environments of the target ERP system and environments of the source ERP system, and/or the like.

As shown as another example, the rapid deployment platform may add a group of users to the target ERP system. In this example, the rapid deployment platform may log in to particular environments of the ERP package and may interact with aspects of interfaces of the particular environments to add users that are to have access to the particular environments. The rapid deployment platform may identify users that are permitted to access the particular environments by referencing a data source of the organization.

In some implementations, the rapid deployment platform may automatically perform only a subset of the set of post-installation procedures. For example, the rapid deployment platform may identify a post-installation procedure that is unable to be performed automatically and/or may identify a post-installation procedure that was unsuccessfully performed automatically. In this case, the rapid deployment platform may provide, to another device, a request to have a human manually perform the identified post-installation procedure. Furthermore, the rapid deployment platform may indicate a reason why the identified post-installation procedure was unable to be automatically performed, such that the other device may be able to identify corrective actions or additional actions that may allow the rapid deployment platform to automatically perform the identified post-installation procedure when preparing other environments.

In this way, the rapid deployment platform automatically performs post-installation procedures needed to prepare the one or more environments of the target ERP system for deployment.

Figure 1D:
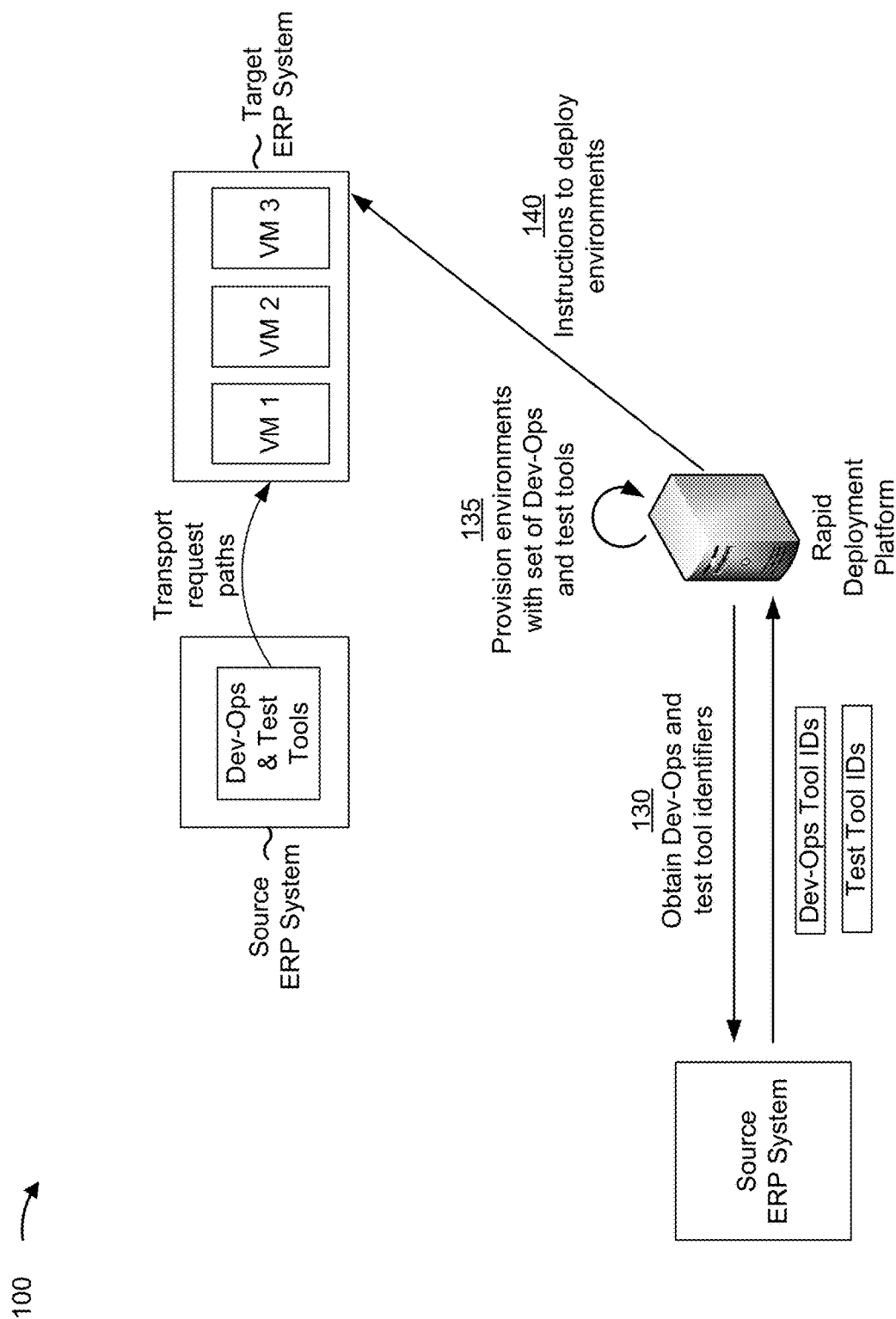

As shown in FIG. 1D, the rapid deployment platform may provision the one or more environments with a set of Dev-Ops and test tools and may provide instructions to the group of devices to deploy the one or more environments. The Dev-Ops and test tools may include one or more development tools, one or more operational tools, one or more testing tools, and/or the like. To provide a few examples, the Dev-Ops and test tools may include a component-based test automation (CBTA) tool, a tool that tracks change requests, transport requests, and/or the like (e.g., ChaRM), a Dev-Ops orchestration tool, an automated design optimization program (ADOP), an automation testing tool, a tool for creating and/or testing process hierarchies and/or the like. In some implementations, the rapid deployment platform may utilize a set of templates when provisioning the set of Dev-Ops and test tools. The set of templates may specify particular Dev-Ops and test tool configurations. For example, different configurations of an automation testing tool may be created using different templates, such that one of the templates may be used to implement a specific configuration of the automation testing tool within the one or more environments.

As shown by reference number 130, the rapid deployment platform may obtain a set of Dev-Ops and test tool identifiers from the source ERP system. For example, a data structure may be used to store a set of Dev-Ops and test tool identifiers that identify storage locations of the set of Dev-Ops and test tools that are stored as part of the source ERP system. Additionally, or alternatively, the data structure may be used to store a set of template identifiers that identify storage locations of the set of templates. In this case, the set of Dev-Ops and test tool identifiers may be stored in association with identifiers of categories that serve as logical ways to segment the set of Dev-Ops and test tools, such as a domain identifier for an industry domain associated with particular Dev-Ops and test tools, a project type identifier for a type of project that relates to particular Dev-Ops and test tools, a content identifier for a type of content associated with particular Dev-Ops and test tools, and/or the like. The set of templates may be stored in association with categories in a similar manner.

In some implementations, the rapid deployment platform may use a search query to search the data structure for the set of Dev-Ops and test tool identifiers. For example, the rapid deployment platform may use, as input for the search query, information included in the request (e.g., the request made in connection with FIG. 1A), such as a domain identifier for a domain associated with the organization providing the request, and the search query may be used to return the set of Dev-Ops and test tool identifiers that are stored in association with the domain identifier. A similar search query may be used to search for the template identifiers.

In some implementations, the rapid deployment platform may customize a Dev-Ops and test tool and/or a template before the Dev-Ops and test tool and/or the template is provisioned to the one or more environments. For example, the rapid deployment platform may perform a value replacement technique to replace values included in a Dev-Ops tool, a test tool, a template, and/or the like, with new values that satisfy the request (e.g., the request made in connection with FIG. 1A). In this way, when the set of Dev-Ops and test tools and/or the set of templates are provisioned to the target ERP system, the Dev-Ops and test tools and/or the set of templates may be configured with values that are tailored to the organization that is going to be utilizing the target ERP system.

Additionally, or alternatively, the rapid deployment platform may transform a Dev-Ops and test tool into multiple Dev-Ops and test tools (or may transform multiple Dev-Ops and test tools into a single Dev-Ops and test tools). For example, the rapid deployment platform may transform the Dev-Ops and test tool (or multiple Dev-Ops and test tools) based on a type of organization providing the request (e.g., the request provided in connection with FIG. 1A), based on a preference of the organization providing the request, and/or the like.

As shown by reference number 135, the rapid deployment platform may provision the one or more environments with the set of Dev-Ops and test tools and/or the set of templates. For example, the rapid deployment platform may log in to an interface of the target ERP system (or the source ERP system), which may already be configured with transport request paths, as described elsewhere herein. In this case, the rapid deployment platform may select a menu option to create a new transport request and may perform a series of interactions with the interface (e.g., automated mouse clicks, keyboard strokes, etc.) to include the set of Dev-Ops and test tools and/or the set of templates as part of the transport request that is to be provided to the one or more environments.

In some implementations, the rapid deployment platform may provide a particular Dev-Ops and test tool to a particular environment. For example, the particular Dev-Ops and test tool may be applicable to only a particular environment. As an example, a template for creating a design document may be relevant for use as part of the development environment (and in some cases, the testing environment), but may not be useful as part of the production environment. Thereby, the rapid deployment platform may provision the template for creating the design document to one or more instances of the development environment and/or the testing environment (but not to the production environment). In this way, the rapid deployment platform conserves resources (e.g., processing resources, memory resources, etc.) that would otherwise be expended on provisioning the template to all environments (regardless of whether the template is applicable to a particular environment).

As shown by reference number 140, the rapid deployment platform may provide instructions to the group of devices supporting the target ERP system to deploy the one or more environments. For example, the rapid deployment platform may use an API or another type of communication interface to provide instructions to the group of devices to deploy the one or more environments. In this case, the group of devices (e.g., using the one or more virtual machines) may configure the set of Dev-Ops and test tools to the one or more environments. For example, when the transport request is received by a virtual machine that is hosting an environment, the virtual machine may execute an installer package to load particular Dev-Ops and test tools to the environment. In this way, the rapid deployment platform orchestrates configuration of Dev-Ops and test tools within the environment.

Once deployed, a group of user devices associated with the organization that requested the target ERP system may be able to access the one or more environments. In some cases, the rapid deployment platform may provide, to the user device, an indication that the request has been satisfied and that the target ERP system has been configured and/or deployed.

In this way, the rapid deployment platform orchestrates automatic configuration and/or deployment of the one or more environments of the target ERP system. This conserves processing resources and/or network resources that would otherwise be used to manually configure and/or deploy the one or more environments, correct configuration and/or deployment errors caused by the manual configuration and/or deployment of the one or more environments, and/or the like.

As indicated above, FIGS. 1A-1D are provided merely as an example. Other examples are possible and may differ from what was described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementations 100 may perform one or more functions described as being performed by another set of devices of example implementations 100.

Figure 2:
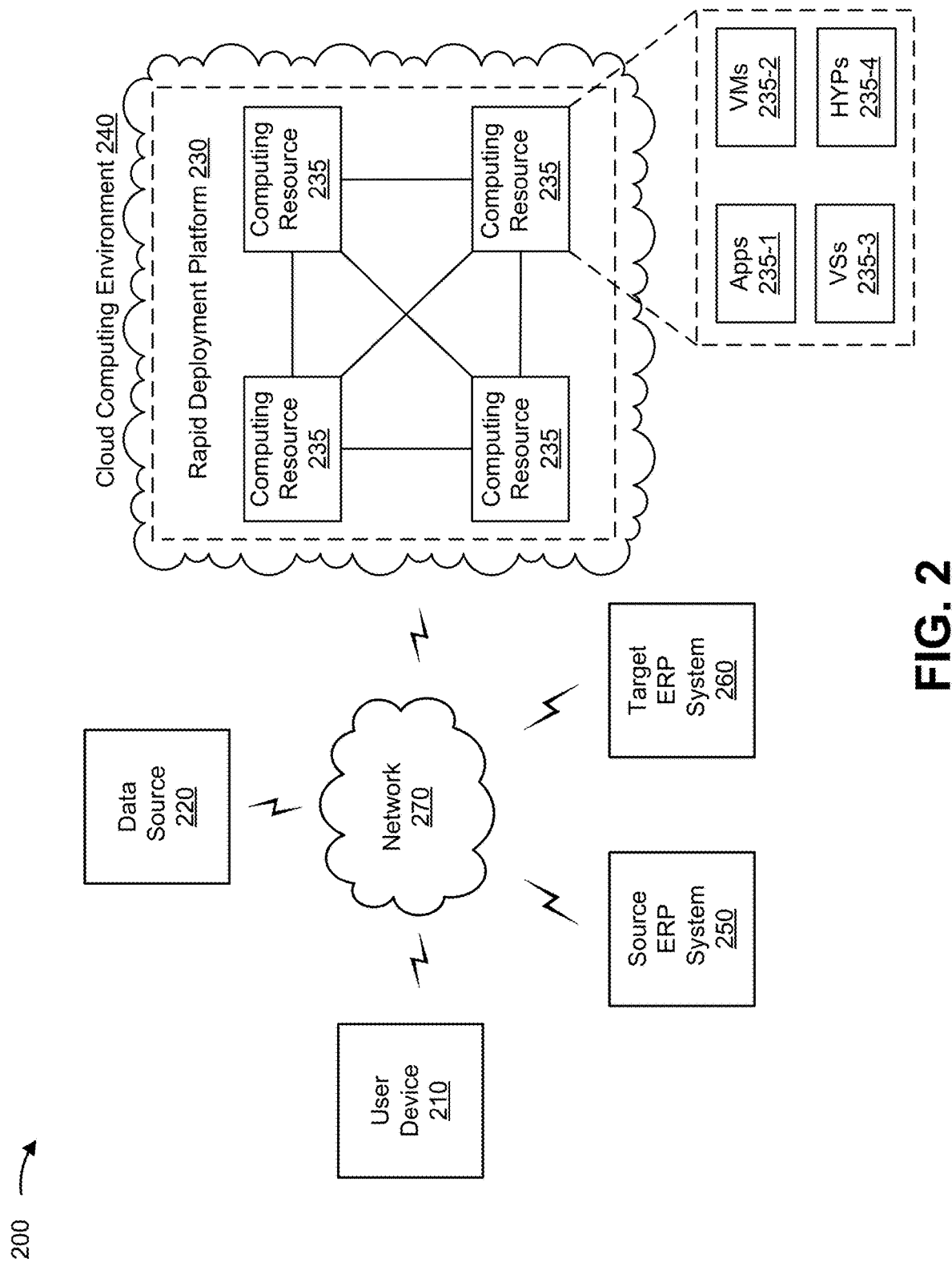
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a data source 220, a rapid deployment platform 230 hosted within a cloud computing environment 240, a source ERP system 250, a target ERP system 260, and/or a network 270. Devices of environment 200 may interconnect via wired connections, wireless connections, or a combination of wired and wireless connections.

User device 210 includes one or more devices capable of receiving, generating, storing, processing, and/or providing information associated with a request to configure and/or deploy an environment of target ERP system 260. For example, user device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device.

In some implementations, user device 210 may provide, to rapid deployment platform 230, a request to configure an environment for target ERP system 260. In some implementations, user device 210 may receive an indication that the environment has been configured and/or deployed. In some implementations, user device 210 may access the environment after the environment has been deployed. In some implementations, user device 210 may be associated with a vendor organization that is using rapid deployment platform 230 internally. Additionally, or alternatively, user device 210 may be associated with a client organization that is engaging with a vendor organization to use rapid deployment platform 230.

Data source 220 includes one or more devices capable of receiving, storing, generating, determining, and/or providing information associated with configuration and/or deployment of target ERP system 260. For example, data source 220 may include a server device or a group of server devices. In some implementations, data source 220 may receive a request to obtain an ERP package from rapid deployment platform 230. In some implementations, data source 220 may be associated with a vendor organization that creates the ERP package. In some implementations, data source 220 may be associated with a vendor organization that supports rapid deployment platform 230.

Rapid deployment platform 230 includes one or more devices capable of receiving, storing, processing, generating, determining, and/or providing information associated with configuration and/or deployment of an environment of target ERP system 260. For example, rapid deployment platform 230 may include a server device (e.g., a host server, a web server, an application server, etc.), a data center device, or a similar device.

In some implementations, as shown, rapid deployment platform 230 may be hosted outside of source ERP system 250 and/or target ERP system 260. In some implementations, rapid deployment platform 230 may be hosted as part of source ERP system 250. In some implementations, rapid deployment platform may be hosted as part of target ERP system 260. In some implementations, one or more processes and/or features performed by rapid deployment platform 230 may be performed by source ERP system 250 and/or target ERP system 260.

In some implementations, rapid deployment platform 230 may provide a system image and/or installation information to a group of devices that are to support target ERP system 260 (e.g., devices associated with one or more cloud service providers, devices used to host target ERP system 260 on-site, one or more devices associated with one or more cloud service providers and one or more devices used to host target ERP system 260 on-site, etc.). This may cause the group of devices to configure one or more virtual machines that may be used to host the environment of target ERP system 260. In some implementations, rapid deployment platform 230 may automatically perform a set of post-installation procedures to prepare the environment for deployment.

In some implementations, rapid deployment platform 230 may obtain a set of development-operations (Dev-Ops) and test tools from source ERP system 250. In some implementations, rapid deployment platform 230 may provision one or more virtual machines with the set of Dev-Ops and test tools (e.g., using transport request paths that may have been established as one of the post-installation procedures). In some implementations, rapid deployment platform 230 may interact with one or more devices of environment 200 to perform actions based on machine learning, as described elsewhere herein.

In some implementations, as shown, rapid deployment platform 230 may be hosted in cloud computing environment 240. Notably, while implementations described herein describe rapid deployment platform 230 as being hosted in cloud computing environment 240, in some implementations, rapid deployment platform 230 may not be cloud-based (i.e., may be implemented outside of a cloud computing environment) or may be partially cloud-based.

Cloud computing environment 240 includes an environment that hosts rapid deployment platform 230. Cloud computing environment 240 may provide computation, software, data access, storage, etc. services that do not require end-user knowledge of a physical location and configuration of system(s) and/or device(s) that hosts rapid deployment platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host rapid deployment platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210, source ERP system 250, and/or target ERP system 260. Application 235-1 may eliminate a need to install and execute the software applications on these devices. For example, application 235-1 may include software associated with rapid deployment platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, source ERP system 250, target ERP system 260, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Source ERP system 250 includes one or more devices capable of receiving, storing, processing, generating, and/or providing information associated with tools that may be used within an environment of an ERP system (e.g., source ERP system 250, target ERP system 260, etc.). For example, source ERP system 250 may include a server device or a group of server devices. In some implementations, source ERP system 250 may be a Systems Applications and products (SAP) ERP system or a similar type of ERP system. In some implementations, source ERP system 250 may include one or more systems and/or processes for supporting a development environment, a quality environment, a production environment, and/or the like. In some implementations, source ERP system 250 may provide a set of Dev-Ops and test tools to target ERP system 260 (e.g., using a transport request established by rapid deployment platform 230). In some implementations, source ERP system 250 may provide the set of Dev-Ops and test tools to rapid deployment platform 230, which may provide the set of Dev-Ops and test tools to target ERP system 260.

Target ERP system 260 includes one or more devices capable of receiving, storing, processing, generating, and/or providing information associated with configuration and/or deploying of an environment within target ERP system 260. For example, target ERP system 260 may include a server device or a group of server devices. In some implementations, target ERP system 260 may be a SAP ERP system or a similar type of ERP system. In some implementations, target ERP system 260 may include one or more systems and/or processes for supporting a development environment, a quality environment, a production environment, and/or the like.

Network 270 includes one or more wired and/or wireless networks. For example, network 270 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
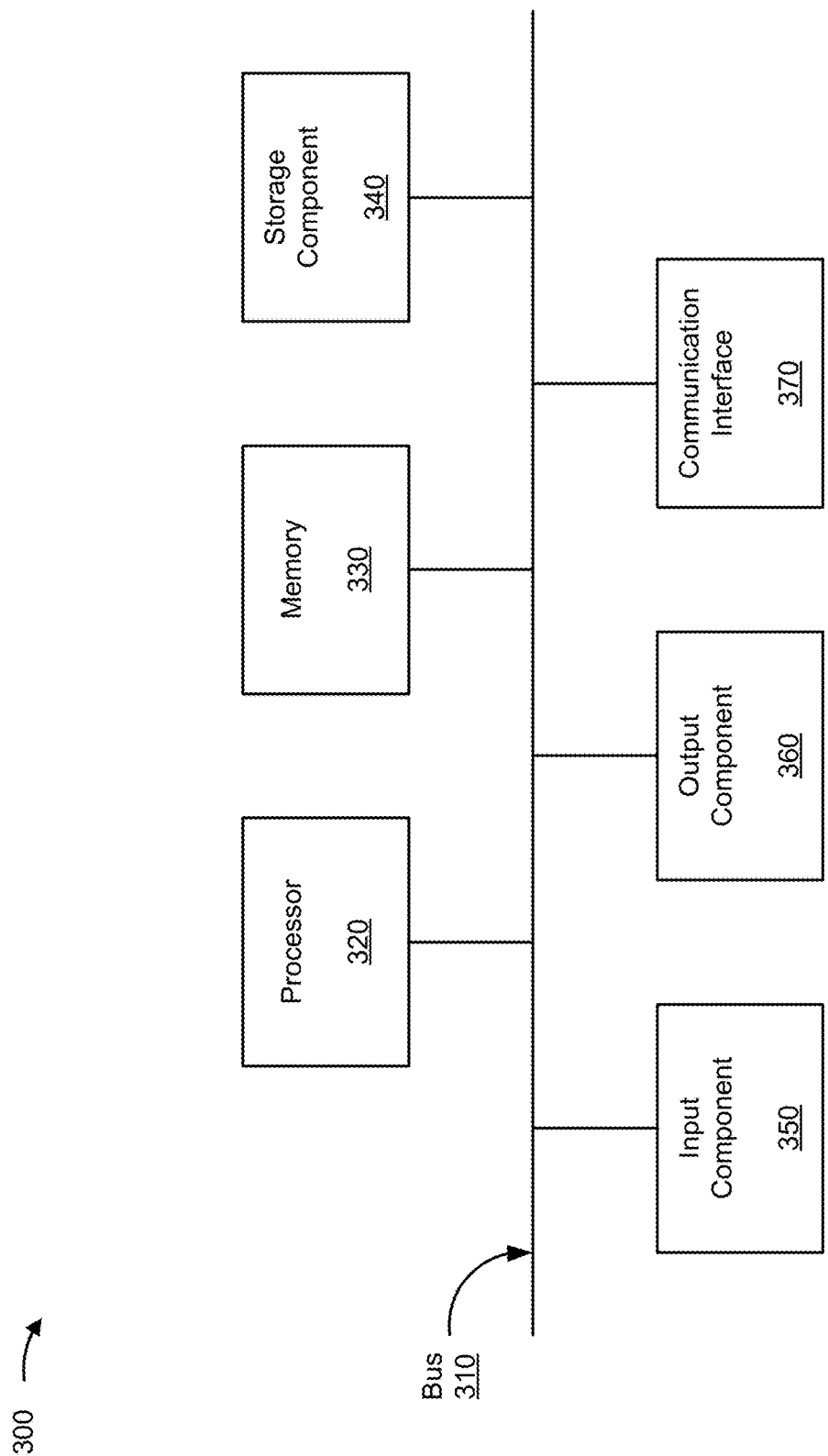
FIG. 3 is a diagram of example components of one or more devices of FIG. 2.

FIG. 3 is a diagram of example components of a device 300. Device 300 may correspond to user device 210, data source 220, rapid deployment platform 230, source ERP system 250, and/or target ERP system 260. In some implementations, user device 210, data source 220, rapid deployment platform 230, source ERP system 250, and/or target ERP system 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
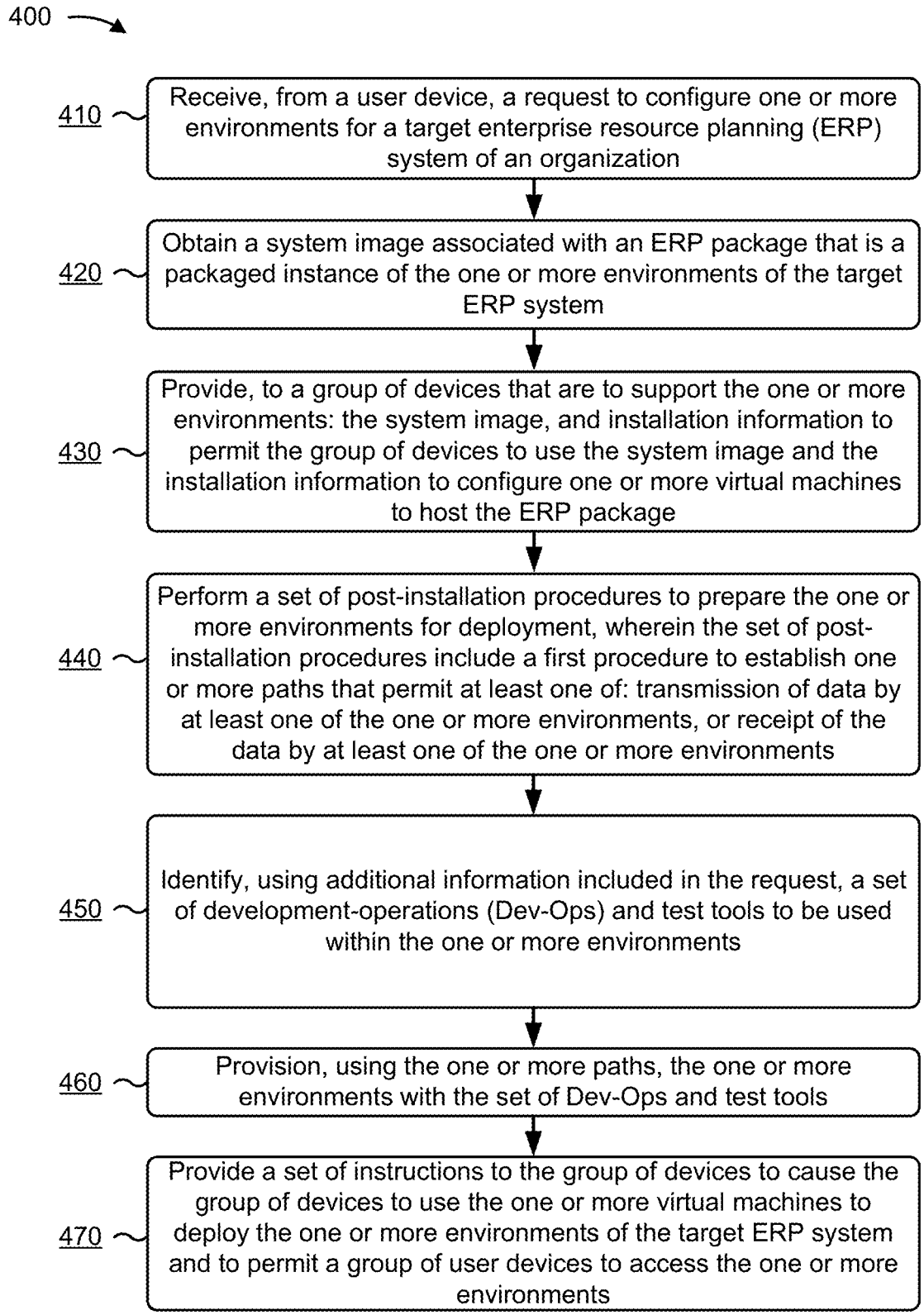
FIGS. 4-6 are flow charts of an example process for automatically configuring and deploying one or more environments for a target enterprise resource planning (ERP) system of an organization.

FIG. 4 is a flow chart of an example process 400 for automatically configuring and deploying one or more environments for a target enterprise resource planning (ERP) system of an organization. In some implementations, one or more process blocks of FIG. 4 may be performed by a rapid deployment platform (e.g., rapid deployment platform 230). In some implementations, one or more process blocks of FIG. 4 may be performed by another device or a group of devices separate from or including the rapid deployment platform, such as a user device (e.g., user device 210), a data source (e.g., data source 220), a source enterprise resource planning (ERP) system (e.g., source ERP system 250), and/or a target ERP system (e.g., target ERP system 260).

As shown in FIG. 4, process 400 may include receiving, from a user device, a request to configure one or more environments for a target enterprise resource planning (ERP) system of an organization (block 410). For example, the rapid deployment platform (e.g., rapid deployment platform 230, using computing resource 235, processor 320, memory 330, input component 350, communication interface 370, etc.) may receive, from a user device (e.g., user device 210), a request to configure one or more environments for a target ERP system of an organization, as described above with regard to FIGS. 1A-1D.

As further shown in FIG. 4, process 400 may include obtaining, using information included in the request, a system image associated with an ERP package that is a packaged instance of the one or more environments of the target ERP system (block 420). For example, the rapid deployment platform (e.g., rapid deployment platform 230, using computing resource 235, processor 320, memory 330, input component 350, output component 360, communication interface 370, etc.) may obtain, using information included in the request, a system image associated with an ERP package that is a packaged instance of the one or more environments of the target ERP system, as described above with regard to FIGS. 1A-1D.

As further shown in FIG. 4, process 400 may include providing, to a group of devices that are to support the one or more environments, the system image, and installation information to permit the group of devices to use the system image and the installation information to configure one or more virtual machines to host the ERP package (block 430). For example, the rapid deployment platform (e.g., rapid deployment platform 230, using computing resource 235, processor 320, memory 330, output component 360, communication interface 370, etc.) may provide, to a group of devices that are to support the one or more environments (e.g., the group of devices that are to support target ERP system 260), the system image and installation information to permit the group of devices to use the system image and the installation information to configure one or more virtual machines to host the ERP package, as described above with regard to FIGS. 1A-1D.

As further shown in FIG. 4, process 400 may include performing a set of post-installation procedures to prepare the one or more environments for deployment, wherein the set of post-installation procedures include a first procedure to establish one or more paths that permit at least one of: transmission of data to at least one of the one or more environments, or receipt of the data by at least one of the one or more environments (block 440). For example, the rapid deployment platform (e.g., rapid deployment platform 230, using computing resource 235, processor 320, memory 330, input component 350, output component 360, communication interface 370, etc.) may perform a set of post-installation procedures to prepare the one or more environments for deployment, as described above with regard to FIGS. 1A-1D. In some implementations, the set of post-installation procedures may include a first procedure to establish one or more paths that permit at least one of: transmission of data to at least one of the one or more environments or receipt of the data by at least one of the one or more environments As further shown in FIG. 4, process 400 may include identifying, using additional information included in the request a set of development-operations (Dev-Ops) and test tools to be used within the one or more environments (block 450). For example, the rapid deployment platform (e.g., rapid deployment platform 230, using computing resource 235, processor 320, memory 330, etc.) may identify, using additional information included in the request, a set of Dev-Ops and test tools to be used within the one or more environments, as described above with regard to FIGS. 1A-1D.

As further shown in FIG. 4, process 400 may include provisioning, using the one or more paths, the one or more environments with the set of Dev-Ops and test tools (block 460). For example, the rapid deployment platform (e.g., rapid deployment platform 230, using computing resource 235, processor 320, memory 330, input component 350, output component 360, communication interface 370, etc.) may provision, using the one or more paths, the one or more environments with the set of Dev-Ops and test tools, as described above with regard to FIGS. 1A-1D.

As further shown in FIG. 4, process 400 may include providing a set of instructions to the group of devices to cause the group of devices to use the one or more virtual machines to deploy the one or more environments of the target ERP system and to permit a group of user devices to access the one or more environments (block 470). For example, the rapid deployment platform (e.g., rapid deployment platform 230, using computing resource 235, processor 320, memory 330, output component 360, communication interface 370, etc.) may provide a set of instructions to the group of devices to cause the group of devices to use the one or more virtual machines to deploy the one or more environments of the target ERP system and to permit a group of user devices (e.g., a group of user devices 210) to access the one or more environments, as described above with regard to FIGS. 1A-1D.

Process 400 may include additional implementations, such as any single implementation or any combination of implementations described below and/or in connection with one or more other processes described elsewhere herein.

In some implementations, the ERP package may include a core ERP system and/or a development management system. In some implementations, the one or more environments may include a development environment, a testing environment, and/or a production environment. In some implementations, the group of devices may include a first subgroup of cloud servers associated with a first cloud service provider, a second subgroup of cloud servers associated with a second cloud service provider, and/or a third subset of servers hosted on one or more sites of the organization.

In some implementations, the rapid deployment platform, when obtaining the system image, may obtain the system image associated with the ERP package and one or more additional system images associated with one or more other ERP packages. In some implementations, the rapid deployment platform, when providing the system image and the installation information, may provide the system image and the installation information to a first device, of the group of devices, to cause the first device to configure a first virtual machine to host the ERP package. Additionally, the rapid deployment platform may provide the one or more additional system images and the installation information to one or more additional devices, of the group of devices, to cause the one or more additional devices to configure one or more additional virtual machines to host the one or more other ERP packages.

In some implementations, the rapid deployment platform, when providing the system image and the installation information, may provide, as part of the installation information, system information values that permit the group of devices to perform a value replacement technique to replace one or more placeholder system information values included in the ERP package with the system information values included in the installation information. This may cause the group of devices, after configuring the one or more virtual machines, to perform the value replacement technique.

In some implementations, the organization may be a client organization. In some implementations, the rapid deployment platform may obtain document styling information relating to the client organization. In some implementations, the rapid deployment platform may identify a template of a Dev-Ops and test tool that is to be customized. In some implementations, the rapid deployment platform may modify the template of the Dev-Ops and test tool by replacing current values with new values based on the document styling information. In some implementations, when identifying the set of Dev-Ops and test tools, the rapid deployment platform may identify the template of the Dev-Ops and test tool that includes the new values.

In some implementations, the rapid deployment platform may identify a template of a Dev-Ops and test tool to provision to the one or more environments. For example, assume an organization providing the request is a third-party client organization. In this case, the rapid deployment platform may obtain document styling information and/or hierarchical information relating to the client organization and may use the document styling information and/or the hierarchical information to identify a template of a Dev-Ops and test tool that is to be provisioned to the one or more environments. To obtain the document styling information and/or the hierarchical information, the rapid deployment platform may reference a data structure that associates the document styling information and/or the hierarchical information with the set of templates.

The document styling information may include information identifying type of content the client organization prefers to include in a document, information identifying a preferred way in which the client organization likes to structure the content, information identifying file type or file format of the document, and/or the like. The hierarchical information may include information identifying a structure of the client organization, such as information identifying a set of departments within the client organization, information identifying a hierarchy of the set of departments, and/or the like.

In some implementations, the rapid deployment platform may use the document styling information and/or the hierarchical information to customize a template. In this case, and the rapid deployment platform may identify the template and may modify the template to include values found in the document styling information and/or the hierarchical information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
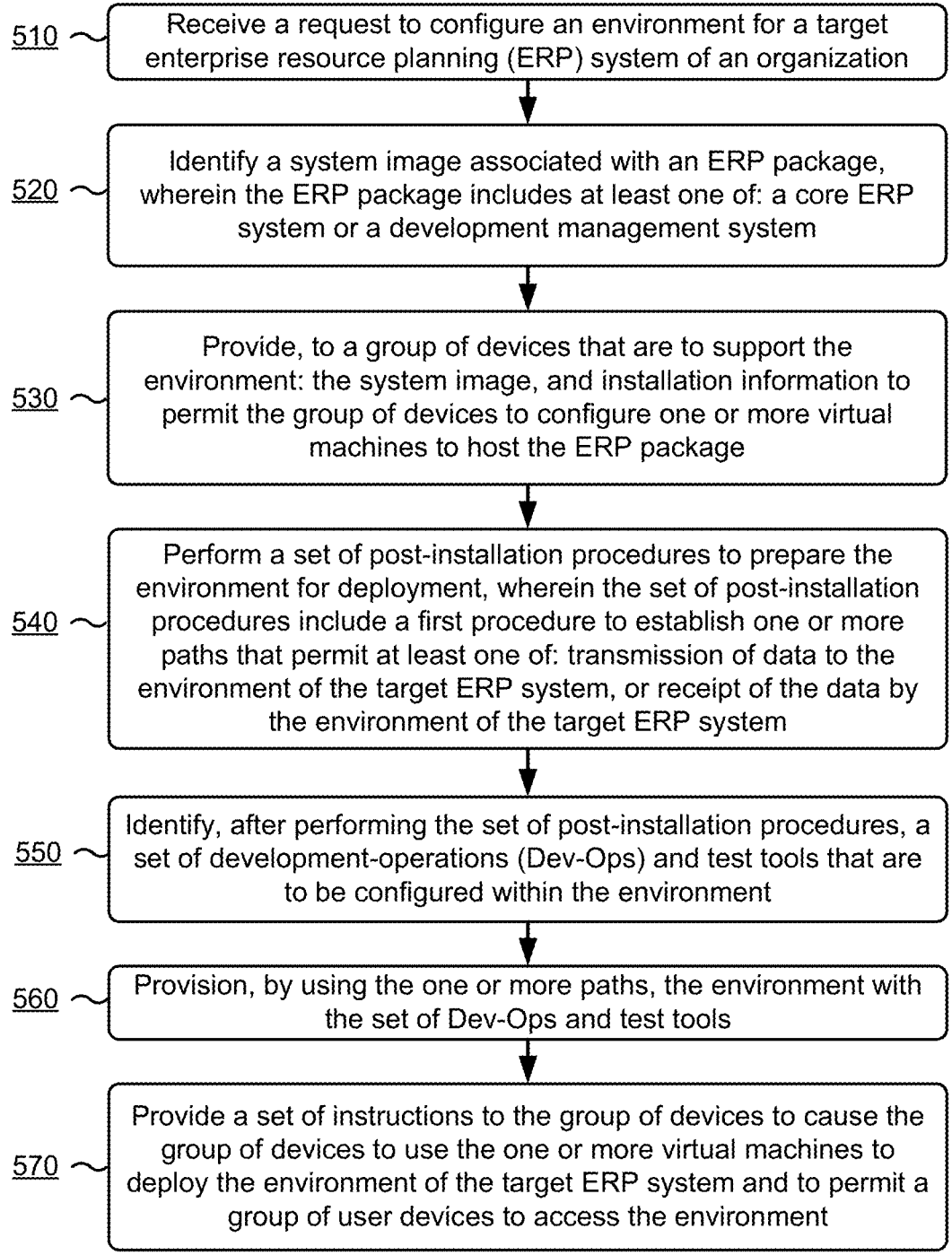

FIG. 5 is a flow chart of an example process 500 for automatically configuring and deploying one or more environments for a target enterprise resource planning (ERP) system of an organization. In some implementations, one or more process blocks of FIG. 5 may be performed by a rapid deployment platform (e.g., rapid deployment platform 230). In some implementations, one or more process blocks of FIG. 5 may be performed by another device or a group of devices separate from or including the rapid deployment platform, such as a user device (e.g., user device 210), a data source (e.g., data source 220), a source enterprise resource planning (ERP) system (e.g., source ERP system 250), and/or a target ERP system (e.g., target ERP system 260).

As shown in FIG. 5, process 500 may include receiving, from a user device, a request to configure an environment for a target enterprise resource planning (ERP) system of an organization (block 510). For example, the rapid deployment platform (e.g., rapid deployment platform 230, using computing resource 235, processor 320, memory 330, input component 350, communication interface 370, etc.) may receive, from a user device (e.g., user device 210), a request to configure an environment for a target ERP system (e.g., target ERP system 260) of an organization, as described above with regard to FIGS. 1A-1D.

As further shown in FIG. 5, process 500 may include identifying, after receiving the request, a system image associated with an ERP package, wherein the ERP package includes at least one of: a core ERP system or a development management system (block 520). For example, the rapid deployment platform (e.g., rapid deployment platform 230, using computing resource 235, processor 320, memory 330, etc.) may identify, after receiving the request, a system image associated with an ERP package, wherein the ERP package includes a core ERP system and/or a development management system, as described above with regard to FIGS. 1A-1D.

As further shown in FIG. 5, process 500 may include providing, to a group of devices that are to support the environment: the system image, and installation information to permit the group of devices to configure one or more virtual machines to host the ERP package (block 530). For example, the rapid deployment platform (e.g., rapid deployment platform 230, using computing resource 235, processor 320, memory 330, output component 360, communication interface 370, etc.) may provide, to a group of devices that are to support the environment (e.g., devices that are to support target ERP system 260): the system image, and installation information to permit the group of devices to configure one or more virtual machines to host the ERP package, as described above with regard to FIGS. 1A-1D.

As further shown in FIG. 5, process 500 may include performing a set of post-installation procedures to prepare the environment for deployment, wherein the set of post-installation procedures include a first procedure to establish one or more paths that permit at least one of: transmission of data to the environment of the target ERP system, or receipt of the data by the environment of the target ERP system (block 540). For example, the rapid deployment platform (e.g., rapid deployment platform 230, using computing resource 235, processor 320, memory 330, input component 350, output component 360, communication interface 370, etc.) may perform a set of post-installation procedures to prepare the environment for deployment, as described above with regard to FIGS. 1A-1D. In some implementations, the set of post-installation procedures may include a first procedure to establish one or more paths that permit at least one of: transmission of data to the environment of the target ERP system, or receipt of the data by the environment of the target ERP system.

As further shown in FIG. 5, process 500 may include identifying, after performing the set of post-installation procedures, a set of development-operations (Dev-Ops) and test tools that are to be configured within the environment (block 550). For example, the rapid deployment platform (e.g., rapid deployment platform 230, using computing resource 235, processor 320, memory 330, etc.) may identify, after performing the set of post-installation procedures, a set of Dev-Ops and test tools that are to be configured within the environment, as described above with regard to FIGS. 1A-1D.

As further shown in FIG. 5, process 500 may include provisioning, by using the one or more paths, the environment with the set of Dev-Ops and test tools (block 560). For example, the rapid deployment platform (e.g., rapid deployment platform 230, using computing resource 235, processor 320, memory 330, output component 360, communication interface 370, etc.) may provision, by using the one or more paths, the environment with the set of Dev-Ops and test tools, as described above with regard to FIGS. 1A-1D.

As further shown in FIG. 5, process 500 may include providing a set of instructions to the group of devices to cause the group of devices to use the one or more virtual machines to deploy the environment of the target ERP system and to permit a group of user devices to access the environment (block 570). For example, the rapid deployment platform (e.g., rapid deployment platform 230, using computing resource 235, processor 320, memory 330, output component 360, communication interface 370, etc.) may provide a set of instructions to the group of devices to cause the group of devices to use the one or more virtual machines to deploy the environment of the target ERP system and to permit a group of user devices (e.g., a group of user devices 210) to access the environment, as described above with regard to FIGS. 1A-1D.

Process 500 may include additional implementations, such as any single implementation or any combination of implementations described below and/or in connection with one or more other processes described elsewhere herein.

In some implementations, a set of templates of the set of Dev-Ops and test tools are to be used when provisioning the environment. In some implementations, the request to configure the environment may be a request to configure a plurality of environments In some implementations, the rapid deployment platform may prepare, after identifying the system image associated with the ERP package, the installation information by: establishing an account with a cloud service provider that is to use the group of devices to host the environment, and preparing infrastructure information for a network infrastructure of the target ERP system.

In some implementations, the rapid deployment platform may, when identifying the system image, identify the system image associated with the ERP package and another system image associated with another ERP package. The ERP package may include a core ERP system and the other ERP package includes a development management system. In some implementations, the rapid deployment platform may, when providing the system image and the installation information to the group of devices, may provide the system image and the installation information to a first device, of the group of devices, to cause the first device to configure a first virtual machine to host the ERP package. Additionally, the rapid deployment platform may provide the other system image and the installation information to one or more additional devices, of the group of devices, to cause the one or more additional devices to configure another virtual machine to host the other ERP package.

In some implementations, the rapid deployment platform, when providing the system image and the installation information, may provide the system image and the installation information to a first device, of the group of devices, that is associated with a first cloud service provider. Additionally, the rapid deployment platform may provide the system image and the installation information to a second device, of the group of devices, that is associated with a second cloud service provider. Additionally, the rapid deployment platform may provide the system image and the installation information to a third device, of the group of devices, that is associated with a site of the organization.

In some implementations, the organization may be a client organization. In some implementations, the rapid deployment platform may obtain hierarchical information relating to the client organization. In some implementations, the rapid deployment platform may identify, by comparing the hierarchical information relating to the client organization to hierarchical information of a source organization, a discrepancy between a hierarchical structure of the client organization and a hierarchical structure of the source organization. In some implementations, the rapid deployment platform may identify a set of templates of the set of Dev-Ops and test tools that are to be customized. In some implementations, the rapid deployment platform may dynamically replace information included in the set of templates with new information after identifying the discrepancy. In some implementations, the rapid deployment platform, when identifying the set of Dev-Ops and test tools, may identify the set of templates that include the new information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
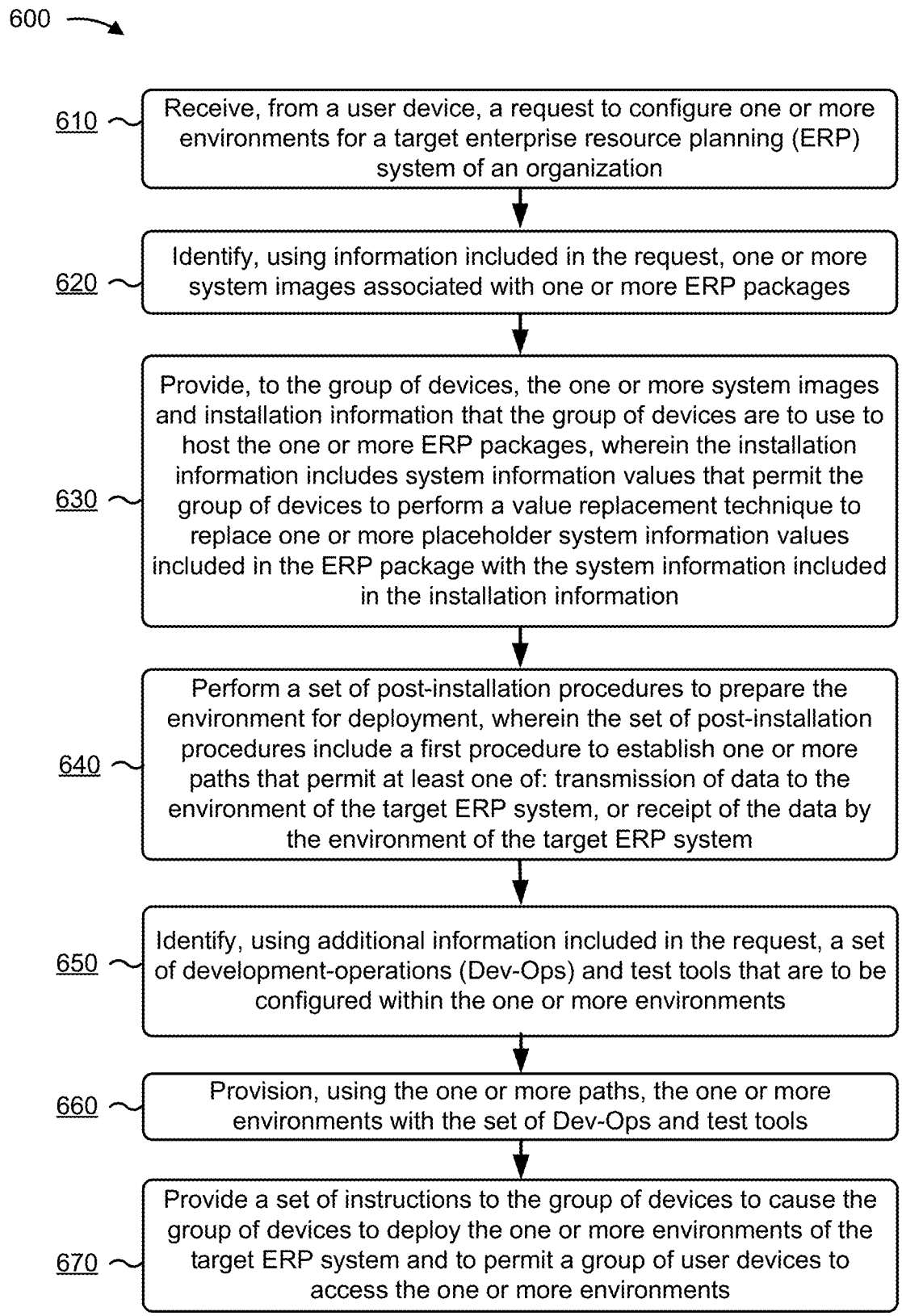

FIG. 6 is a flow chart of an example process 600 for automatically configuring and deploying one or more environments for a target enterprise resource planning (ERP) system of an organization. In some implementations, one or more process blocks of FIG. 6 may be performed by a rapid deployment platform (e.g., rapid deployment platform 230). In some implementations, one or more process blocks of FIG. 6 may be performed by another device or a group of devices separate from or including the rapid deployment platform, such as a user device (e.g., user device 210), a data source (e.g., data source 220), a source enterprise resource planning (ERP) system (e.g., source ERP system 250), and/or a target ERP system (e.g., target ERP system 260).

As shown in FIG. 6, process 600 may include receiving, from a user device, a request to configure one or more environments for a target enterprise resource planning (ERP) system of an organization (block 610). For example, the rapid deployment platform (e.g., rapid deployment platform 230, using computing resource 235, processor 320, memory 330, input component 350, communication interface 370, etc.) may receive, from a user device (e.g., user device 210), a request to configure one or more environments for a target ERP system of an organization, as described above with regard to FIGS. 1A-1D.

As further shown in FIG. 6, process 600 may include identifying, using information included in the request, one or more system images associated with one or more ERP packages (block 620). For example, the rapid deployment platform (e.g., rapid deployment platform 230, using computing resource 235, processor 320, memory 330, etc.) may identify, using information included in the request, one or more system images associated with one or more ERP packages, as described above with regard to FIGS. 1A-1D.

As further shown in FIG. 6, process 600 may include providing, to the group of devices, the one or more system images and installation information that the group of devices are to use to host the one or more ERP packages, wherein the installation information includes system information values that permit the group of devices to perform a value replacement technique to replace one or more placeholder system information values included in the ERP package with the system information included in the installation information (block 630). For example, the rapid deployment platform (e.g., rapid deployment platform 230, using computing resource 235, processor 320, memory 330, output component 360, communication interface 370, etc.) may provide, to the group of devices (e.g., devices that are to support target ERP system 260), the one or more system images and installation information that the group of devices are to use to host the one or more ERP packages, as described above with regard to FIGS. 1A-1D. In some implementations, the installation information may include system information values that permit the group of devices to perform a value replacement technique to replace one or more placeholder system information values included in the ERP package with the system information included in the installation information.

As further shown in FIG. 6, process 600 may include performing a set of post-installation procedures to prepare the one or more environments for deployment, wherein the set of post-installation procedures include a first procedure to establish one or more paths that permit at least one of: transmission of data to the one or more environments of the target ERP system, or receipt of the data by the one or more environments of the target ERP system (block 640). For example, the rapid deployment platform (e.g., rapid deployment platform 230, using computing resource 235, processor 320, memory 330, input component 350, output component 360, communication interface 370, etc.) may perform a set of post-installation procedures to prepare the one or more environments for deployment, as described above with regard to FIGS. 1A-1D. In some implementations, the set of post-installation procedures may include a first procedure to establish one or more paths that permit at least one of: transmission of data to the one or more environments of the target ERP system, or receipt of the data by the one or more environments of the target ERP system.

As further shown in FIG. 6, process 600 may include identifying, using additional information included in the request, a set of development-operations (Dev-Ops) and test tools to be used within the one or more environments (block 650). For example, the rapid deployment platform (e.g., rapid deployment platform 230, using computing resource 235, processor 320, memory 330, etc.) may identify, using additional information included in the request, a set Dev-Ops and test tools to be used within the one or more environments, as described above with regard to FIGS. 1A-1D.

As further shown in FIG. 6, process 600 may include provisioning, using the one or more paths, the one or more environments with the set of Dev-Ops and test tools (block 660). For example, the rapid deployment platform (e.g., rapid deployment platform 230, using computing resource 235, processor 320, memory 330, input component 350, output component 360, communication interface 370, etc.) may provision, using the one or more paths, the one or more environments with the set of Dev-Ops and test tools, as described above with regard to FIGS. 1A-1D.

As further shown in FIG. 6, process 600 may include providing a set of instructions to the group of devices to cause the group of devices to deploy the one or more environments of the target ERP system and to permit a group of user devices to access the one or more environments (block 670). For example, the rapid deployment platform (e.g., rapid deployment platform 230, using computing resource 235, processor 320, memory 330, output component 360, communication interface 370, etc.) may provide a set of instructions to the group of devices to cause the group of devices to deploy the one or more environments of the target ERP system and to permit a group of user devices (e.g., a group of user devices 210) to access the one or more environments, as described above with regard to FIGS. 1A-1D.

Process 600 may include additional implementations, such as any single implementation or any combination of implementations described below and/or in connection with one or more other processes described elsewhere herein.

In some implementations, the one or more ERP packages may be a plurality of ERP packages. In some implementations, the plurality of ERP packages may include a first packaged instance that includes a core ERP system and/or a second packaged instance that includes a development management system.

In some implementations, the rapid deployment platform, when identifying the one or more system images and the installation information, may obtain a first system image, of the one or more system images, associated with a first ERP package, of the one or more ERP packages, of a first environment of the one or more environments. Additionally, the rapid deployment platform may obtain a second system image, of the one or more system images, associated with a second ERP package, of the one or more ERP packages, of a second environment of the one or more environments. In some implementations, the rapid deployment platform, when providing the one or more system images and the installation information to the group of devices, may provide the first system image and the installation information to a first device, of the group of devices, to cause the first device to configure a first virtual machine to host the first ERP package. Additionally, the rapid deployment platform may provide the second system image and the installation information to another device, of the group of devices, to cause the other device to configure a second virtual machine to host the second ERP package.

In some implementations, the group of devices may include a first subgroup of cloud servers associated with a first cloud service provider, a second subgroup of cloud servers associated with a second cloud service provider, and/or a third subset of servers hosted on one or more sites of the organization. In some implementations, the set of Dev-Ops and test tools are based on a set of templates that are tailored to a preference of the organization.

In some implementations, the rapid deployment platform may identify a template of a Dev-Ops and test tool that satisfies a preference of the organization as indicated by the request. In some implementations, when identifying the set of Dev-Ops and test tools, the rapid deployment platform may identify the template of the Dev-Ops and test tool.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the rapid deployment platform orchestrates automatic configuration and deployment of the one or more environments of the target ERP system. By orchestrating automatic configuration and deployment of the one or more environments, the rapid deployment platform reduces an amount of time needed to complete one or more phases of the product development life cycle. This conserves processing resources and/or network resources that would otherwise be used to manually configure and deploy the one or more environments, correct configuration and/or deployment errors caused by the manual configuration and deployment of the one or more environments, and/or the like.

Additionally, by orchestrating automatic configuration and deployment of Dev-Ops and test tools within the one or more environments, the rapid deployment platform reduces a utilization of processing resources and/or network resources that would be used to synergize the Dev-Ops and test tools with other tools within the one or more environments, that would be used to debug the Dev-Ops and test tools within the one or more environments, and/or the like. Furthermore, in some cases, the rapid deployment platform may use machine learning to intelligently predict one or more requirements to be used for configuration of an environment of the ERP system. This reduces time needed to complete the blueprinting phase of the product development life cycle, thereby reducing a utilization of resources (e.g., human resources, computing resources, etc.) needed to identify and select the one or more requirements.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, operatively connected to the one or more memories, to:
receive, from a user device, of a group of user devices, a request to configure one or more environments for a target enterprise resource planning (ERP) system of an organization;
obtain, using information included in the request, a system image associated with an ERP package that is a packaged instance of the one or more environments of the target ERP system;
provide, to a group of devices that are to support the one or more environments:
the system image, and
installation information to permit the group of devices to use the system image and the installation information to configure one or more virtual machines to host the ERP package;
perform a set of post-installation procedures to prepare the one or more environments for deployment,
wherein the set of post-installation procedures include a first procedure to establish one or more paths that permit at least one of:
transmission of data to at least one of the one or more environments, or
receipt of the data by at least one of the one or more environments;
identify, using additional information included in the request, a set of development-operations (Dev-Ops) and test tools to be used within the one or more environments;
provision, using the one or more paths, the one or more environments with the set of Dev-Ops and test tools; and
provide a set of instructions to the group of devices to cause the group of devices to use the one or more virtual machines to deploy the one or more environments of the target ERP system and to permit the group of user devices to access the one or more environments.

2. The device of claim 1, wherein the ERP package includes at least one of:
a core ERP system, or
a development management system.

3. The device of claim 1, wherein the one or more environments include at least one of:
a development environment,
a testing environment, or
a production environment.

4. The device of claim 1, wherein the one or more processors, when obtaining the system image, are to:
obtain the system image associated with the ERP package and one or more additional system images associated with one or more other ERP packages; and
wherein the one or more processors, when providing the system image and the installation information to the group of devices, are to:

provide the system image and the installation information to a first device, of the group of devices, to cause the first device to configure a first virtual machine to host the ERP package, and provide the one or more additional system images and the installation information to one or more additional devices, of the group of devices, to cause the one or more additional devices to configure one or more additional virtual machines to host the one or more other ERP packages.

5. The device of claim 1, wherein the group of devices include at least one of:
   a first subgroup of cloud servers associated with a first cloud service provider,
   a second subgroup of cloud servers associated with a second cloud service provider, or
   a third subgroup of servers hosted on one or more sites of the organization.

6. The device of claim 1, wherein the one or more processors, when providing the system image and the installation information, are to:
   provide, as part of the installation information, system information values that permit the group of devices to perform a value replacement technique to replace one or more placeholder system information values included in the ERP package with the system information values included in the installation information,
      wherein the group of devices, after configuring the one or more virtual machines, are to perform the value replacement technique.

7. The device of claim 1, wherein the organization is a client organization; and wherein the one or more processors are further to:
   obtain document styling information relating to the client organization;
   identify a template of a Dev-Ops and test tool that is to be customized;
   modify the template of the Dev-Ops and test tool by replacing current values with new values based on the document styling information; and
   wherein the one or more processors, when identifying the set of Dev-Ops and test tools, are to:
      identify the template of the Dev-Ops and test tool that includes the new values.

8. A method, comprising:
   receiving, by a device and from a user device, a request to configure an environment for a target enterprise resource planning (ERP) system of an organization;
   identifying, by the device and after receiving the request, a system image associated with an ERP package,
      wherein the ERP package includes at least one of:
         a core ERP system, or
         a development management system;
   providing, by the device and to a group of devices that are to support the environment:
      the system image, and
      installation information to permit the group of devices to configure one or more virtual machines to host the ERP package;
   performing, by the device, a set of post-installation procedures to prepare the environment for deployment,
      wherein the set of post-installation procedures include a first procedure to establish one or more paths that permit at least one of:
         transmission of data to the environment of the target ERP system, or
         receipt of the data by the environment of the target ERP system;
   identifying, by the device and after performing the set of post-installation procedures, a set of development-operations (Dev-Ops) and test tools that are to be configured within the environment;
   provisioning, by the device and by using the one or more paths, the environment with the set of Dev-Ops and test tools; and
   providing, by the device, a set of instructions to the group of devices to cause the group of devices to use the one or more virtual machines to deploy the environment of the target ERP system and to permit a group of user devices to access the environment.

9. The method of claim 8, wherein a set of templates of the set of Dev-Ops and test tools are to be used when provisioning the environment.

10. The method of claim 8, wherein the request to configure the environment is a request to configure a plurality of environments.

11. The method of claim 8, further comprising:
   preparing, after identifying the system image associated with the ERP package, the installation information by:
      establishing an account with a cloud service provider that is to use the group of devices to host the environment, and
      preparing infrastructure information for a network infrastructure of the target ERP system.

12. The method of claim 8, wherein identifying the system image comprises:
   identifying the system image associated with the ERP package and another system image associated with another ERP package,
      wherein the ERP package includes the core ERP system and the other ERP package includes the development management system; and
   wherein providing the system image and the installation information to the group of devices comprises:
      providing the system image and the installation information to a first device, of the group of devices, to cause the first device to configure a first virtual machine to host the ERP package, and
      providing the other system image and the installation information to one or more additional devices, of the group of devices, to cause the one or more additional devices to configure another virtual machine to host the other ERP package.

13. The method of claim 8, wherein providing the system image and the installation information comprises:
   providing the system image and the installation information to a first device, of the group of devices, that is associated with a first cloud service provider,
   providing the system image and the installation information to a second device, of the group of devices, that is associated with a second cloud service provider, and
   providing the system image and the installation information to a third device, of the group of devices, that is associated with a site of the organization.

14. The method of claim 8, wherein the organization is a client organization; wherein the method further comprises:
   obtaining first hierarchical information relating to the client organization;
   identifying, by comparing the first hierarchical information relating to the client organization and second hierarchical information of a source organization, a discrepancy between a first hierarchical structure of the client organization and a second hierarchical structure of the source organization;

identifying a set of templates of the set of Dev-Ops and test tools that are to be customized;

dynamically replacing information included in the set of templates with new information after identifying the discrepancy; and wherein identifying the set of Dev-Ops and test tools comprises:

identifying the set of templates that include the new information.

15. A non-transitory computer-readable medium storing instructions, the instructions comprising:

one or more instructions that, when executed by one or more processors, cause the one or more processors to:

receive, from a user device, a request to configure one or more environments for a target enterprise resource planning (ERP) system of an organization;

identify, using information included in the request, one or more system images associated with one or more ERP packages;

provide, to a group of devices, the one or more system images and installation information that the group of devices are to use to host the one or more ERP packages, wherein the installation information includes system information values that permit the group of devices to perform a value replacement technique to replace one or more placeholder system information values included in the ERP package with system information included in the installation information;

perform a set of post-installation procedures to prepare the one or more environments for deployment, wherein the set of post-installation procedures include a first procedure to establish one or more paths that permit at least one of:

transmission of data to the one or more environments of the target ERP system, or receipt of the data by the one or more environments of the target ERP system;

identify, using additional information included in the request, a set of development-operations (Dev-Ops) and test tools to be used within the one or more environments;

provision, using the one or more paths, the one or more environments with the set of Dev-Ops and test tools; and provide a set of instructions to the group of devices to cause the group of devices to deploy the one or more environments of the target ERP system and to permit a group of user devices to access the one or more environments.

16. The non-transitory computer-readable medium of claim 15, wherein the one or more ERP packages are a plurality of ERP packages; and wherein the plurality of ERP packages include at least one of:

a first packaged instance that includes a core ERP system, and a second packaged instance that includes a development management system.

17. The non-transitory computer-readable medium of claim 15, wherein the one or more instructions, that cause the one or more processors to identify the one or more system images and the installation information, cause the one or more processors to:

obtain a first system image, of the one or more system images, associated with a first ERP package, of the one or more ERP packages, of a first environment of the one or more environments, obtain a second system image, of the one or more system images, associated with a second ERP package, of the one or more ERP packages, of a second environment of the one or more environments; and wherein the one or more instructions, that cause the one or more processors to provide the one or more system images and the installation information to the group of devices, cause the one or more processors to:

provide the first system image and the installation information to a first device, of the group of devices, to cause the first device to configure a first virtual machine to host the first ERP package, and provide the second system image and the installation information to another device, of the group of devices, to cause the other device to configure a second virtual machine to host the second ERP package.

18. The non-transitory computer-readable medium of claim 15, wherein the group of devices include at least one of:

a first subgroup of cloud servers associated with a first cloud service provider, a second subgroup of cloud servers associated with a second cloud service provider, or a third subgroup of servers hosted on one or more sites of the organization.

19. The non-transitory computer-readable medium of claim 15, wherein the set of Dev-Ops and test tools are based on a set of templates that are tailored to a preference of the organization.

20. The non-transitory computer-readable medium of claim 15, wherein the one or more instructions, when executed by the one or more processors, further cause the one or more processors to:

identify a template of a Dev-Ops and test tool that satisfies a preference of the organization as indicated in the request; and wherein the one or more instructions, that cause the one or more processors to identify the set of Dev-Ops and test tools, cause the one or more processors to:

identify the template of the Dev-Ops and test tool.

* * * * *